United States Patent
Wang

(10) Patent No.: US 12,308,953 B2
(45) Date of Patent: May 20, 2025

(54) COMMUNICATION DEVICE AND HOST SYSTEM FOR REDUCING COMMUNICATION INTERFERENCE BASED ON BIT EXTENSION MECHANISM

(71) Applicant: Realtek Semiconductor Corp., HsinChu (TW)

(72) Inventor: Chun-Kai Wang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/444,772

(22) Filed: Feb. 19, 2024

(65) Prior Publication Data

US 2024/0380512 A1 Nov. 14, 2024

Related U.S. Application Data

(60) Provisional application No. 63/466,336, filed on May 14, 2023.

(30) Foreign Application Priority Data

Dec. 20, 2023 (TW) .................... 112149617

(51) Int. Cl.
*H04L 1/18* (2023.01)
*H04L 1/00* (2006.01)
(52) U.S. Cl.
CPC .................. *H04L 1/0002* (2013.01)
(58) Field of Classification Search
None
See application file for complete search history.

(56) References Cited

U.S. PATENT DOCUMENTS

| | | | | |
|---|---|---|---|---|
| 2007/0204205 A1* | 8/2007 | Niu | ........... | H04N 19/67 714/780 |
| 2008/0063116 A1* | 3/2008 | Yokoyama | ........... | H04B 7/0656 375/299 |
| 2010/0106510 A1* | 4/2010 | Topchy | ........... | G11B 20/10 704/E19.009 |
| 2010/0134278 A1* | 6/2010 | Srinivasan | ........... | G06Q 30/02 340/539.13 |
| 2010/0280641 A1* | 11/2010 | Harkness | ........... | H04N 21/4394 700/94 |
| 2010/0322000 A1* | 12/2010 | Shim | ........... | G11C 16/10 365/185.18 |

(Continued)

FOREIGN PATENT DOCUMENTS

| CN | 202488751 U | 10/2012 |
|---|---|---|
| CN | 105227567 A | 1/2016 |

*Primary Examiner* — Mujtaba M Chaudry
(74) *Attorney, Agent, or Firm* — Winston Hsu

(57) ABSTRACT

A communication device includes: a wired communication circuit, a wireless communication circuit and a bit stream converter. The wired communication circuit is configured to exchange information with a host system via wired communication. The wireless communication circuit is configured to o exchange information with a wireless communication device via wireless communication. The bit stream converter is configured to selectively perform bit stream conversion on a bit stream between the communication device and the host system according to frequency band information corresponding to the wireless communication.

16 Claims, 3 Drawing Sheets

(56) References Cited

U.S. PATENT DOCUMENTS

2013/0114516 A1\* 5/2013 Koo .................. H04W 72/1215
　　　　　　　　　　　　　　　　　　　　　455/501
2016/0182167 A1\* 6/2016 Fischer .................. H04L 45/74
　　　　　　　　　　　　　　　　　　　　　370/312

\* cited by examiner

COMMUNICATION DEVICE AND HOST SYSTEM FOR REDUCING COMMUNICATION INTERFERENCE BASED ON BIT EXTENSION MECHANISM

CROSS REFERENCE TO RELATED APPLICATIONS

This application claims the benefit of U.S. Provisional Application No. 63/466,336, filed on May 14, 2023. The content of the application is incorporated herein by reference.

BACKGROUND OF THE INVENTION

1. Field of the Invention

The present invention relates to the field of communications, more particularly to a communication device and associated host system that utilizes a bit extension mechanism to reduce communication interference.

2. Description of the Prior Art

Universal Serial Bus (USB) 3.0 Gen1 communication protocol adopts a link rate of 5 Gbps for transmission. Additionally, in order to mitigate electromagnetic interference (EMI), USB 3.0 Gen1 also employs scrambling and spread spectrum techniques to prevent the spectrum of digital signals from being overly concentrated in specific frequency bands. However, this results in the USB 3.0 Gen1 communication protocol causing significant interference in 2.5 GHZ band during data transmission. The 2.5 GHz band frequency band is notably close to the 2.4 GHz band used by wireless communication technologies such as Wi-Fi and Bluetooth. Moreover, since USB 3.0 uses a downward spread spectrum mechanism, it may severely interfere with Wi-Fi or Bluetooth communications within the 2.4 GHz band. Such interference, amplified by signal attenuation (e.g., during long-distance transmission), can considerably impact actual data throughput, effectively limiting effective transmission ranges for Wi-Fi or Bluetooth communications. In the related art, although some methods have been proposed to address the interference of USB communications on Wi-Fi or Bluetooth communications, such as changing circuit layouts, adding shielding, or switching USB transmission modes, these solutions have their limitations and cannot comprehensively solve the issue.

SUMMARY OF THE INVENTION

In light of above, it is one object of the present invention to provide a mechanism that utilizes bit extension to convert bit streams of USB communications, thereby reducing the number of consecutive 0/1 transitions within the USB communication bit streams during given time. Such mechanism can alter the frequency bands affected by the USB communication, thus avoiding interference with the frequency bands used by wireless communications.

According to one embodiment, a communication device is provided. The communication device comprises a wired communication circuit, a wireless communication circuit and a bit stream converter. The wired communication circuit is configured to exchange information with a host system via wired communication. The wireless communication circuit is configured to exchange information with a wireless communication device via wireless communication. The bit stream converter is configured to selectively perform bit stream conversion on a bit stream transmitted between the communication device and the host system based on frequency band information corresponding to the wireless communication.

According to one embodiment, a host system is provided. The host system comprises a wired communication circuit and a bit stream converter. The wired communication circuit is configured to exchange information with a communication device via wired communication, wherein the communication device is further configured to exchange information with a wireless communication device via wireless communication. The bit stream converter is configured to selectively perform bit stream conversion on a bit stream transmitted between the communication device and the host system based on frequency band information corresponding to the wireless communication.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
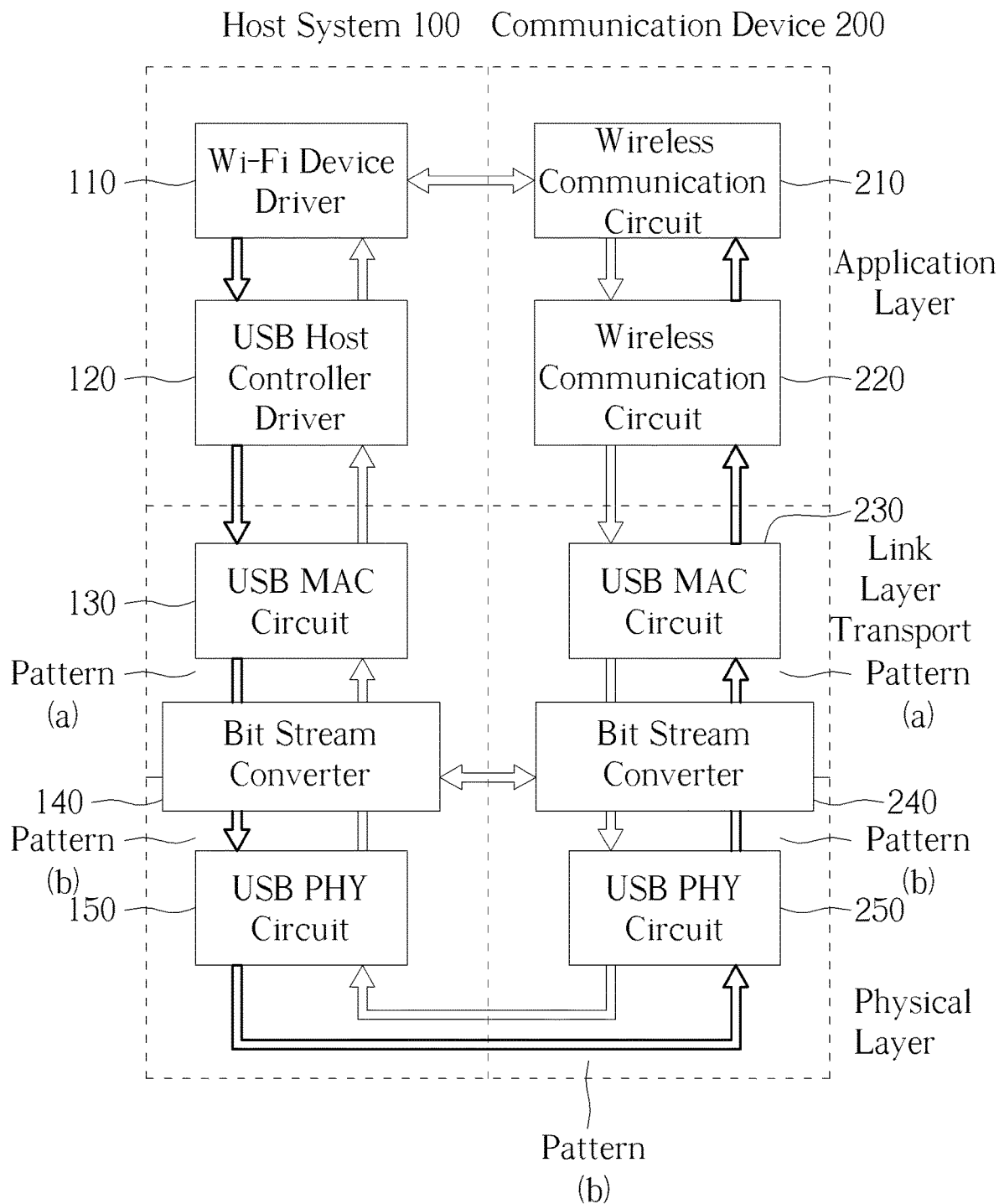
FIG. 1 is a schematic diagram of architecture of a host system and a communication device according to one embodiment of the present invention.

Referring to FIG. 1, a schematic diagram of architecture of a host system and a communication device according to one embodiment of the present invention is depicted. As depicted in FIG. 1, a host system 100 includes (but is not limited to) a Wi-Fi device driver 110, a USB host controller driver 120, a USB Medium Access Control layer circuit (hereafter referred to as USB MAC circuit) 130, a bit stream converter 140, and a USB Physical layer circuit (hereafter referred to as USB PHY circuit) 150. Additionally, a communication device 200 comprises wireless communication circuits 210 and 220, a USB MAC circuit 230, a bit stream converter 240, and a USB PHY circuit 250. The Wi-Fi device driver 110, the USB host controller driver 120, and USB device control circuits 210 and 220 are at application layers of the host system 100 and communication device 200, respectively. The USB MAC circuits 130 and 230 are at link layer transport sections of the host system 100 and communication device 200, respectively. The USB PHY circuits 150 and 250 are at physical layers of the host system 100 and communication device 200, respectively. From the above, it can be understood that the host system 100 and the communication device 200 can exchange data and messages through the USB bus.

In various embodiments, the host system 100 may be a variety of different types of devices, such as personal computers (including desktops and laptops), mobile devices (e.g., smartphones and tablets), multimedia players (e.g., digital music players or streaming media devices), printers, digital cameras, and embedded systems (e.g., home automation systems or automotive infotainment systems). The communication device 200 might be a wireless network interface device, having the capability to connect to one or multiple types of wireless networks, including but not limited to, Wi-Fi, Bluetooth or networks with other wireless communication protocols. Specifically, the communication device 200 enables the host system 100 to connect to a Wi-Fi network or device, facilitating data transfer and message exchange with Wi-Fi devices (e.g., wireless routers, smart TVs, Network Attached Storage (NAS), game consoles). Similarly, the communication device 200 can also enable the host system 100 to connect to Bluetooth networks or devices, facilitating data transfer and message exchange with Bluetooth devices (e.g., Bluetooth speakers, Bluetooth headphones, smart watches). With the capabilities of the communication device 200, the host system 100 can transfer data and exchange messages with one or multiple wireless communication devices (not shown). In other words, the host system 100 can communicate with one or multiple wireless communication devices through USB communication with the communication device 200.

In the communication device 200, the wireless communication circuits 210 and 220 are configured to perform wireless communication with one or multiple wireless communication devices through one or more wireless networks (including but not limited to Wi-Fi and Bluetooth). The wireless communication circuits 210 and 220 utilize USB communication to exchange messages with the Wi-Fi device driver 110 and USB host controller driver 120 of the host system 100, thereby to be controlled by the drivers of the host system 100. Furthermore, the USB MAC circuits 130 and 230, along with the USB PHY circuits 150 and 250, function as wired communication circuits in the host system 100 and the communication device 200, respectively. The USB MAC circuits 130 and 230 and the USB PHY circuits 150 and 250 are responsible for the wired communication between the host system 100 and the communication device 200. Specifically, the USB MAC circuits 130 and 230 are configured to handle specific operations and processing on data/signals/information related to the MAC layer. These operations and processing (but are not limited to) packing and un-packing data received from higher layers, conversion of data into packet with specific formats, and error detections on received packets. On the other hand, the USB PHY circuits 150 and 250 are configured to handle specific operations and processing on data/signals/information related to the PHY layer. These operations and processing include (but are not limited to) converting data from digital form into signals that can be transmitted on a physical medium, and on the receiving end, converting these signals back to their digital form, as well as synchronization during data transmission and reception.

The bit stream converter 140 is configured to perform bit stream conversion between the USB MAC circuit 130 and the USB PHY circuit 150 in specific conditions. For example, the bit stream converter 140 could perform a bit extension on data transmitted from the USB MAC circuit 130 to the USB PHY circuit 150 (i.e., USB downstream data that is transmitted from the host system 100 to the communication device 200). Additionally, the bit stream converter 140 could perform a bit restoration on data transmitted from the USB PHY circuit 150 to the USB MAC circuit 130 (i.e., USB upstream data that is transmitted from the communication device 200 to the host system 100). Similarly, the bit stream converter 240 is configured to perform bit stream conversion between the USB MAC circuit 230 and the USB PHY circuit 250 in specific conditions. For example, the bit stream converter 240 could perform a bit extension on data transmitted from the USB MAC circuit 230 to the USB PHY circuit 250 (i.e., USB upstream data from the communication device 200 to the host system 100). Additionally, the bit stream converter 240 could perform a bit restoration on data transmitted from the USB PHY circuit 250 to the USB MAC circuit 230 (i.e., USB downstream data from the host system 100 to the communication device 200).

Further, the bit stream converter 140 and the bit stream converter 240 are configured to operate based on signal frequency bands (e.g. 2.4 GHz band or 5 GHz band in Wi-Fi) corresponding to the wireless communications between the communication device 200 and the wireless communication device(s) (not shown), as well as a bit rate corresponding to the wired communication between the host system 100 and the communication device 200, to perform bit stream conversion. For the host system 100, the host system 100 can ascertain the signal frequency band corresponding to the wireless communication between the communication device 200 and the wireless communication device(s) through the Wi-Fi device driver 110, thereby generating frequency band information. Additionally, the host system 100 can also determine a transmission mode corresponding to the USB communication between the host system 100 and the communication device 200 through the USB host controller driver 120, thereby generating bit rate information. On the other hand, the communication device 200 can also obtain the frequency band information and the bit rate information via the wireless communication circuits 210 and 220 and the host system 100. In this manner, the bit stream converters 140 and 240 can be configured to perform bit stream conversion based on the frequency band information and the bit rate information.

Figure 2:
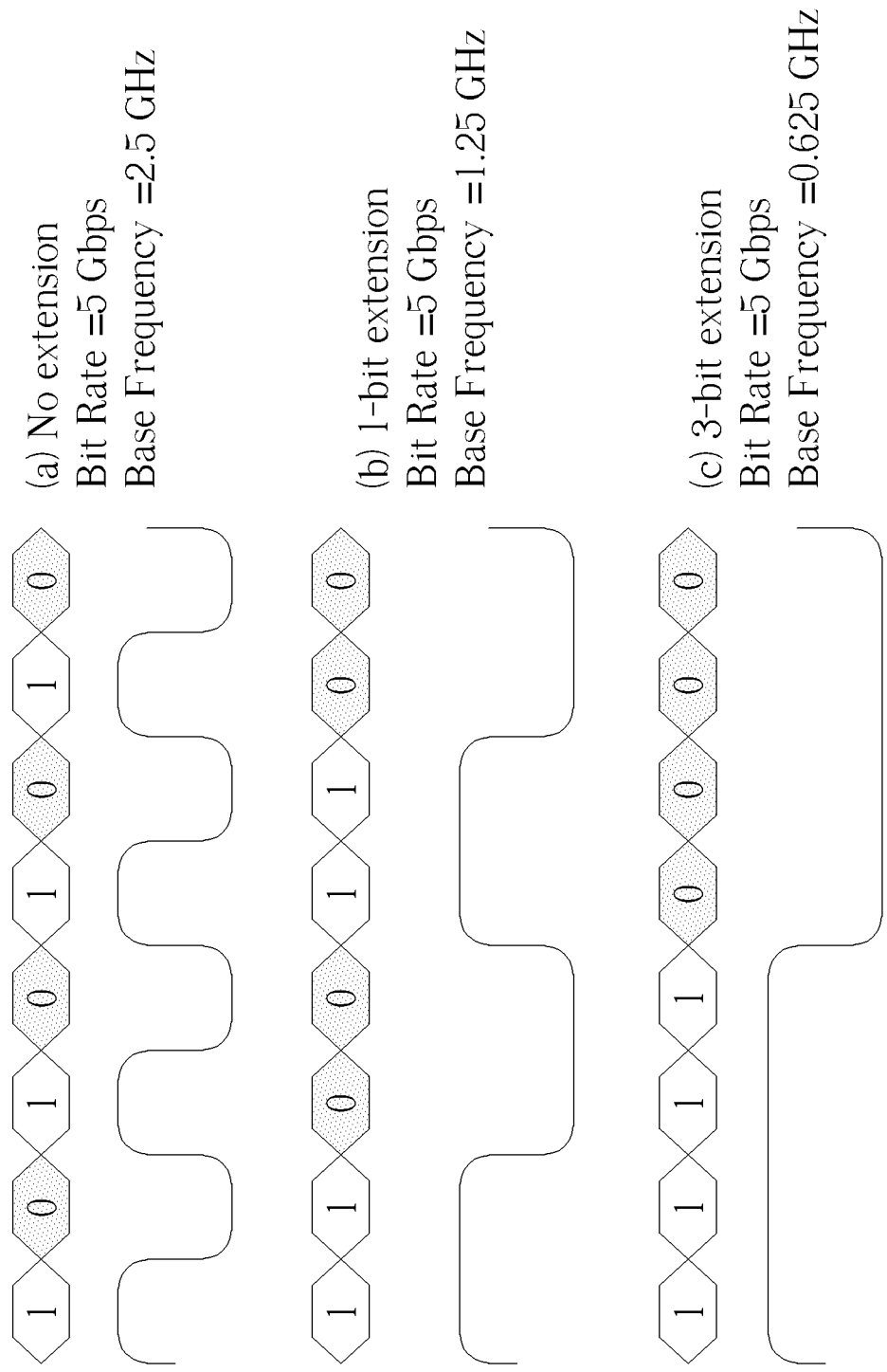
FIG. 2 shows how embodiments of the present invention uses different bit extension forms to change a base frequency of a transmission signal.

FIG. 2 illustrates changes in signal frequency of wired communication between the host system 100 and the communication device 200 due to different bit stream conversion forms. Initially, assuming a uniform distribution of "0" and "1" in a bit stream, a base frequency (Fb) of a transmission signal for the wired communication between the host system 100 and the communication device 200 would correspond to half of the bit rate (BR). That is, the base frequency Fb=0.5BR/(bit). Taking the bit rate of USB 3.0 Gen1 at 5 Gbps as an example, if the bit stream is not subjected to the bit extension, the base frequency of the transmission signal for the wired communication (i.e., USB communication) between the host system 100 and the communication device 200 is at 2.5 GHz. This implies that at this point, the wired communication between the host system 100 and the communication device 200 is likely to cause interference at the 2.5 GHz band (i.e., affected frequency band). On the other hand, after a 1-bit extension (repeating a original bit once) is applied to the bit stream, the base frequency of the USB 3.0 Gen1 communication between the host system 100 and the communication device 200 becomes 1.25 GHz, meaning that the affected frequency band is now 1.25 GHz. Referring back to FIG. 2, if the bit stream undergoes a 3-bit extension (repeating one original bit three times), the base frequency of the USB 3.0 Gen1 communication would shift to 0.625 GHZ, meaning that the affected frequency band is now 0.625 GHz. It is evident from this that the bit stream processed with the bit extension is less likely to interfere with the 2.4 GHz band compared to the bit stream without the bit extension. Therefore, if the base frequency of the transmission signal for wired communication corresponds to an affected frequency band that overlaps with the frequency band of wireless communication, the present invention will activate the bit stream converters 140 and 240 to perform the bit stream conversion. Herein, the bit stream converters 140 and 240 can reduce the base frequency of the USB transmission signal by extending the bit stream of original data sent from the MAC circuits 130 and 230, thereby reducing the number of consecutive "0/1" transitions (i.e., from 0 to 1 and from 1 to 0) within a unit time, and shifting the affected frequency band. By doing so, interference from USB communication on the wireless communication frequency band can be avoided.

It should be noted that, although in the embodiment shown in FIG. 2, the bit stream converters 140 and 240 perform bit extension by repeating bits of the original bit stream, in other embodiments of the present invention, however, the bit extension performed by the bit stream converters 140 and 240 might involve the addition of other padding data into the original bit stream. For example, the bit extension can be performed by adding parity codes or error correction codes into the original bit stream.

In one embodiment, when the communication device 200 is currently using the 2.4 GHz band to wirelessly communicate with another wireless communication device, such as Wi-Fi device or Bluetooth device, the bit stream converters 140 and 240 would decide whether to perform the bit extension based on the bit rate information. If the bit rate information indicates that the transmission mode used between the host system 100 and the communication device 200 corresponds to 5 Gbps bit rate (e.g., USB 3.0, USB 3.1 Gen 1, USB 3.2 Gen 1×1), it means that the affected frequency band is the 2.5 GHZ band. To prevent the USB communication between the host system 100 and the communication device 200 from interfering with the wireless communication between the communication device 200 and the wireless communication device(s), the bit stream converters 140 and 240 would perform the bit extension, thereby shifting the affected frequency band from 2.5 GHz to either 1.25 GHz band (with a 1-bit extension) or 0.625 GHz band (with a 3-bit extension).

In another embodiment, when the communication device 200 is currently using the 5 GHz band for Wi-Fi communication with another wireless communication device(s), the bit stream converters 140 and 240 would decide, based on the bit rate information, whether to perform bit extension. If the bit rate information indicates that the transmission mode used between the host system 100 and the communication device 200 corresponds to 10 Gbps bit rate (e.g., USB 3.1 Gen 2, USB 3.2 Gen 1×2, USB 3.2 Gen 2×1), it means that the affected frequency band is the 5 GHz band. To avoid the wired USB communication between the host system 100 and the communication device 200 from interfering with the wireless communication between the communication device 200 and the wireless communication device(s), the bit stream converters 140 and 240 would perform bit extension, shifting the affected frequency band from the 5 GHz band to either 2.5 GHz band (with a 1-bit extension) or 1.25 GHz band (with a 3-bit extension).

Figure 3:
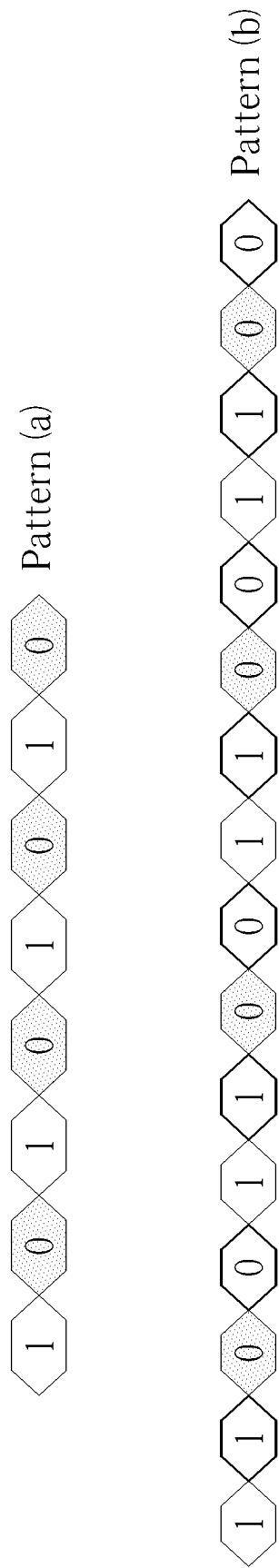
FIG. 3 shows bit stream patterns at different stages of the wired communication between the host system and the communication device shown in FIG. 1.

Please refer to FIG. 1 in conjunction with FIG. 3. These diagrams illustrate changes in patterns of the bit stream between the host system 100 and the communication device 200 across different stages. Specifically, the bit streams transmitted or received by the USB MAC circuits 130 and 230 have a non-extended and original pattern (e.g., pattern (a)). In contrast, the bit streams transmitted or received by the bit stream converters 140 and 240, or the bit streams transmitted between the USB bus interfacing the host system 100 and the communication device 200, have an extended pattern (e.g., pattern (b)). The bit stream converters 140 and 240 would perform the bit restoration by converting the extended bit streams back to their original form. For instance, during a USB downstream transmission, when data is transmitted from the host system 100 to the communication device 200, the bit stream converter 240 within the communication device 200 will restore an extended bit stream (which is originally extended by the bit stream converter 140) to its original form. It is noteworthy that the bit stream converter 240 (or the bit stream converter 140) is configured to detect specific symbols sent by the host system 100 (or the communication device 200) within specific time periods. One example of such specific symbols is IDLE pattern, which is transmitted by the host system 100 (or the communication device 200) to the communication device 200 (or the host system 100) during periods of data inactivity (e.g., no substantial information is transmitted). By recognizing such IDLE patterns, the host system 100 (or the communication device 200) can autonomously determine whether the currently transmitted bit stream has undergone bit extension or remains in its original form, subsequently deciding if the received bit stream requires bit restoration. This is feasible due to the known pattern of these specific symbols (i.e., the IDLE pattern), enabling the receiving end to easily discern if the received bit stream has undergone bit extension.

Please note that although in the aforementioned embodiments, the bit stream converters 140 and 240 are configured to perform the bit extension on bit streams of USB communications to mitigate interference with wireless transmissions, the bit stream converters 140 and 240 can also be applied to other types of wired communications, especially when the base frequency of the wired communication signal overlaps with frequency bands of wireless communications. Furthermore, in the aforementioned embodiment, the bit stream converters 140 and 240 are deployed independently from the USB MAC circuits 130 and 230, as well as independently from the USB PHY circuits 150 and 250. However, in certain implementations of the present invention, the bit stream converters 140 and 240 can be part of or integrated within the USB MAC circuits 130 and 230, or the USB PHY circuits 150 and 250. Additionally, although in the above embodiments, it is mentioned how specific bit rates of the wired communication interfere with specific frequency bands of the wireless communication, those values mentioned in the embodiments are not intended to limit the present invention in scope. The present invention can also be applied in scenarios where different bit rates and various signal frequency bands interfere with each other.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device, comprising:
  a wired communication circuit, configured to exchange information with a host system via wired communication;
  a wireless communication circuit, configured to exchange information with a wireless communication device via wireless communication; and
  a bit stream converter, configured to selectively perform bit stream conversion on a bit stream transmitted between the communication device and the host system based on frequency band information corresponding to the wireless communication.

2. The communication device, wherein the wired communication circuit comprises:
  a physical layer circuit, configured to handle operations and processing on signals, data or information related to a physical layer of the wired communication; and
  a medium access control layer circuit, configured to handle operations and processing on signals, data or information related to a medium access control layer of the wired communication;
  wherein the bit stream converter is configured to perform bit stream conversion on the bit stream transmitted between the physical layer circuit and the medium access control layer circuit.

3. The communication device of claim 1, wherein the bit stream converter is configured to perform a bit extension on the bit stream based on bit rate information corresponding to the wired communication and the frequency band information corresponding to the wireless communication.

4. The communication device of claim 3, wherein the bit stream converter is configured to determine an affected frequency band based on the bit rate information and accordingly determine a number of extending bits corresponding to the bit extension according to the affected frequency band and the frequency band information.

5. The communication device of claim 3, wherein the bit stream converter is configured to perform the bit extension on the bit stream, thereby adding to the bit stream one or more repeated bits corresponding to each bit within the bit stream.

6. The communication device of claim 1, wherein the wired communication circuit is a Universal Serial Bus (USB) communication circuit, and the wired communication is conducted based on one of USB standards including USB 3.0, USB 3.1 Gen 1, USB 3.2 Gen 1×1, USB 3.1 Gen 2, USB 3.2 Gen 1×2 and USB 3.2 Gen 2×1.

7. The communication device of claim 1, wherein the wireless communication circuit is an IEEE 802.11 communication circuit, and the wireless communication is conducted based on one of IEEE 802.11 standards including IEEE 802.11a, IEEE 802.11b, IEEE 802.11g, IEEE 802.11n, IEEE 802.11ac, IEEE 802.11ax and IEEE 802.11be.

8. The communication device of claim 1, wherein if the bit stream is a part of downstream data transmitted from the host system to the communication device, the bit stream converter is configured to process the bit stream with a bit restoration to remove repeated bits from the bit stream; and if the bit stream is a part of upstream data transmitted from the communication device to the host system, the bit stream converter is configured to process the bit stream with a bit extension to add repeated bits to the bit stream.

9. A host system, comprising:
  a wired communication circuit, configured to exchange information with a communication device via wired communication, wherein the communication device is further configured to exchange information with a wireless communication device via wireless communication; and
  a bit stream converter, configured to selectively perform bit stream conversion on a bit stream transmitted between the communication device and the host system based on frequency band information corresponding to the wireless communication.

10. The host system of claim 9, wherein the wired communication circuit comprises:
  a physical layer circuit, configured to handle operations and processing on signals, data or information related to a physical layer of the wired communication; and
  a medium access control layer circuit, configured to handle operations and processing on signals, data or information related to a medium access control layer of the wired communication;
  wherein the bit stream converter is configured to perform bit stream conversion on the bit stream transmitted between the physical layer circuit and the medium access control layer circuit.

11. The host system of claim 9, wherein the bit stream converter is configured to perform a bit extension on the bit stream based on bit rate information corresponding to the wired communication and the frequency band information corresponding to the wireless communication.

12. The host system of claim 11, wherein the bit stream converter is configured to determine an affected frequency band based on the bit rate information and accordingly determine a number of extending bits corresponding to the bit extension according to the affected frequency band and the frequency band information.

13. The host system of claim 11, wherein the bit stream converter is configured to perform the bit extension on the bit stream, thereby adding to the bit stream one or more repeated bits corresponding to each bit within the bit stream.

14. The host system of claim 9, wherein the wired communication circuit is a Universal Serial Bus (USB) communication circuit, and the wired communication is conducted based on one of USB standards including USB 3.0, USB 3.1 Gen 1, USB 3.2 Gen 1×1, USB 3.1 Gen 2, USB 3.2 Gen 1×2 and USB 3.2 Gen 2×1.

15. The host system of claim 9, wherein the wireless communication circuit is an IEEE 802.11 communication circuit, and the wireless communication is conducted based on one of IEEE 802.11 standards including IEEE 802.11a, IEEE 802.11b, IEEE 802.11g, IEEE 802.11n, IEEE 802.11ac, IEEE 802.11ax and IEEE 802.11be.

16. The host system of claim 9, wherein if the bit stream is a part of downstream data transmitted from the host system to the communication device, the bit stream converter is configured to process the bit stream with a bit extension to add repeated bits to the bit stream; and if the bit stream is a part of upstream data transmitted from the communication device to the host system, the bit stream converter is configured to process the bit stream with a bit restoration to remove repeated bits from the bit stream.

\* \* \* \* \*